(12) United States Patent
Kang et al.

(10) Patent No.: US 10,688,431 B2
(45) Date of Patent: Jun. 23, 2020

(54) AIR PURIFIER

(71) Applicant: COWAY CO., LTD, Chungcheongnam-do (KR)

(72) Inventors: Sang-Woo Kang, Seoul (KR); Jun-Hyoung Bae, Seoul (KR)

(73) Assignee: COWAY CO., LTD., Chungcheongnam-do (KR)

(*) Notice: Subject to any disclaimer, the term of this patent is extended or adjusted under 35 U.S.C. 154(b) by 336 days.

(21) Appl. No.: 15/560,661

(22) PCT Filed: Mar. 25, 2016

(86) PCT No.: PCT/KR2016/003086
§ 371 (c)(1),
(2) Date: Sep. 22, 2017

(87) PCT Pub. No.: WO2016/163673
PCT Pub. Date: Oct. 13, 2016

(65) Prior Publication Data
US 2018/0093216 A1    Apr. 5, 2018

(30) Foreign Application Priority Data
Mar. 25, 2016 (KR) .......................... 10-2015-003086

(51) Int. Cl.
*B01D 46/00* (2006.01)
*B01D 46/12* (2006.01)
(Continued)

(52) U.S. Cl.
CPC .............. *B01D 46/12* (2013.01); *B01D 46/00* (2013.01); *B01D 46/0039* (2013.01);
(Continued)

(58) Field of Classification Search
CPC ........ B01D 46/12; B01D 46/00; B01D 46/42; B01D 46/0039; B01D 2273/30; F24F 3/1603
(Continued)

(56) References Cited

U.S. PATENT DOCUMENTS

RE22,584 E * 12/1944 Terry et al. ............. F24F 1/027
62/97
2,908,147 A * 10/1959 Powers .................... F24F 11/30
62/186
(Continued)

FOREIGN PATENT DOCUMENTS

EP       2837897        2/2015
KR    10-2005-0109303   11/2005
(Continued)

OTHER PUBLICATIONS

International Search Report for PCT/KR2016/003086 dated Jun. 29, 2016, 2 pages.

*Primary Examiner* — Minh Chau T Pham
(74) *Attorney, Agent, or Firm* — Dority & Manning, P.A.

(57) ABSTRACT

The present invention provides an air purifier that includes: a purifier body; a first air blower which is provided in the purifier body to introduce, purify and discharge outside air; an air guidance part which is provided on the movement path of the air discharged from the first air blower and is pivotably coupled to the upper end of the purifier body to guide an air discharge direction; and a second air blower which is installed on the air guidance part to blow air.

9 Claims, 9 Drawing Sheets

(51) Int. Cl.
*B01D 46/42* (2006.01)
*F24F 3/16* (2006.01)

(52) U.S. Cl.
CPC ............ *B01D 46/42* (2013.01); *F24F 3/1603* (2013.01); *B01D 2273/30* (2013.01)

(58) Field of Classification Search
USPC ... 55/385.1, 385.3, 418, 419, 420, 467, 471; 123/198 E
See application file for complete search history.

(56) References Cited

U.S. PATENT DOCUMENTS

| | | | |
|---|---|---|---|
| 3,820,536 A | 6/1974 | Anspach, Jr. et al. | |
| 4,867,764 A | 9/1989 | Diskin et al. | |
| 6,372,005 B1 * | 4/2002 | Fiacco | B01D 45/14 |
| | | | 55/400 |
| 7,485,168 B2 * | 2/2009 | Goupil, Jr. | B60H 1/00685 |
| | | | 454/139 |
| 7,879,122 B2 * | 2/2011 | Richter | B60H 1/00471 |
| | | | 454/139 |
| 8,940,066 B2 * | 1/2015 | Richter | B60H 1/00471 |
| | | | 55/385.3 |
| 2006/0032260 A1 * | 2/2006 | Kang | F24F 1/0007 |
| | | | 62/317 |
| 2009/0314164 A1 * | 12/2009 | Yamashita | F24F 3/1603 |
| | | | 96/245 |
| 2013/0055692 A1 * | 3/2013 | Cecchi | B01D 46/42 |
| | | | 55/344 |
| 2016/0184753 A1 * | 6/2016 | Chu | B01D 46/002 |
| | | | 96/74 |

FOREIGN PATENT DOCUMENTS

| | | |
|---|---|---|
| KR | 10-2006-0023457 | 3/2006 |
| KR | 10-2006-0111037 | 10/2006 |
| KR | 10-2012-0020496 | 3/2012 |
| KR | 10-1366061 | 2/2014 |
| KR | 20140096971 | 8/2014 |
| KR | 20150005594 | 1/2015 |
| WO | WO2014119839 | 8/2014 |

\* cited by examiner

AIR PURIFIER

TECHNICAL FIELD

The present disclosure relates to an air purifier, and more specifically, to an air purifier for improving an air flow in an interior space by guiding a discharge direction of flowing air.

BACKGROUND ART

It should be noted that the contents described in this section merely provide background information for the present invention and do not constitute prior art.

Generally, an air purifier intakes contaminated indoor air and filters out dust and odor particles contained in the air using a filter, thereby purifying the air having been intaken to make clean air. The air, purified as described above, is then discharged externally from the air purifier, that is, indoors.

In other words, after the air purifier intakes and purifies contaminated ambient air, the air purifier purifies air around a position in which the air purifier is installed while discharging clean air externally.

To this end, generally, the air purifier may include a blower allowing ambient air to flow in to be discharged as purified air, and filters for filtering dust contained in the air flowing in, odor particles, and the like.

However, the air purifier according to the related art has a structure having an air inlet in one side of a housing, and an air outlet in the other side, a side surface, or an upper surface.

In the air purifier having the structure described above, an air flow in an indoor space is only actively generated in a direction of the air inlet, and in a space in a direction of the air outlet. In the remainder of the indoor space, an air flow is relatively weak. Thus, there may be a disadvantage, in that it may be difficult to purify the entirety of the air within an indoor space in a short amount of time through all of the air of the indoor space flowing through the air purifier.

Moreover, a direction of discharging air from the air purifier may be limited, such that there may be a problem in which circulation of the entirety of air in an interior space in which the air purifier is provided is difficult to achieve.

Thus, the air purifier according to the related art has a disadvantage in which the purifying efficiency of air is low, as compared to an air volume.

DISCLOSURE

Technical Problem

The present disclosure is realized by recognizing at least one of a request or a problem generated in an air purifier according to the related art.

An aspect of the present disclosure may provide an air purifier generating a significant air flow in an interior space.

An aspect of the present disclosure may provide an air purifier of forming circulation of the entirety of air in an interior space in which the air purifier is used.

An aspect of the present disclosure may provide an air purifier improving purifying efficiency of indoor air by forming circulation of the entirety of air in an indoor space by forming a blowing direction of air flowing in the air purifier to be wide.

Technical Solution

According to an aspect of the present disclosure, an air purifier includes: a purifier main body; a first air blowing means provided in the purifier main body to introduce, purify, and discharge external air; an air guidance part provided on a movement path of the air discharged from the first air blowing means and pivotably coupled to an upper surface of the purifier main body to determine an air discharge direction; and a second air blowing means installed on the air guidance part to blow air.

The air guidance part may include: a cover top provided on the upper surface of the purifier main body and provided on a movement path of purified air discharged from the first air blowing means; and a pivotably installed portion pivotably coupled to the cover top, and having the second air blowing means installed therein.

The pivotably installed portion may include: a lower grill provided in an upper portion of the cover top and having the second air blowing means mounted thereon; an upper grill coupled to an upper portion of the lower grill and forming a space in which the second air blowing means is accommodated; and a rotation guide coupled to the lower grill with the cover top interposed therebetween to guide the pivotably installed portion to pivot on the cover top.

The cover top may have a guide rail guiding rotation of the pivotably installed portion on a bottom surface, and the rotation guide may be installed to move on the guide rail.

The lower grill may have a plurality of positioning grooves formed in a bottom surface to be spaced apart from each other, and the cover top may have a positioning rod selectively inserted into the positioning groove to set a rotation angle of the pivotably installed portion.

The purifier main body may include: a main housing having an internal space, in which the first air blowing means is installed; and a guide top provided in an upper surface of the main housing and having the air guidance part mounted thereon.

The guide top may have at least one air inlet, through which external air flows.

The cover top may be installed on the guide top to be rotated, so as to allow the air guidance part and the second air blowing means installed in the air guidance part to be rotated above the purifier main body, an upper surface of the guide top may be provided with a first rail portion, and a lower surface of the cover top may be provided with a second rail portion installed in the first rail portion to be rotated.

The first air blowing means and the second air blowing means may be provided to be independently driven.

The air purifier may have: an air purifying mode discharging air purified in the purifier main body, as the first air blowing means is driven and the second air blowing means is stopped; a blowing mode blowing air, having been introduced, as the first air blowing means is stopped and the second air blowing means is driven; and a purifying and blowing mode applying additional discharge force to purified air, discharged by the first air blowing means, with the second air blowing means to blow the air to an interior space, as the first air blowing means and the second air blowing means are driven.

Advantageous Effects

According to an exemplary embodiment in the present disclosure, an air flow in an interior space is significantly increased, so circulation of the entirety of air may be formed in the interior space in which an air purifier is used.

According to an exemplary embodiment in the present disclosure, compared to the case in which a discharge direction is fixed to an upper portion, a blowing direction of air blowing in an air purifier is formed to be wide, and circulation of the entirety of air is formed indoors, so the purifying efficiency of indoor air may be improved.

According to an exemplary embodiment in the present disclosure, an air purifying mode, a blowing mode, and a purifying and blowing mode are selected, so indoor air purifying efficiency and a function such as formation of circulation of the entirety of air in an interior space may be significantly increased.

BEST MODE FOR INVENTION

Hereinafter, preferred embodiments of the present disclosure will be described with reference to the accompanying drawings. However, the embodiments of the present disclosure may be modified into various other forms, and the scope of the present disclosure is not limited to the embodiments described below. Moreover, the embodiments of the present disclosure are also provided to more fully describe the present disclosure to those skilled in the art. The shape and size of components in the drawings may be exaggerated for clarity.

Hereinafter, an air purifier 10 according to an exemplary embodiment of the present disclosure will be described in detail with reference to the drawings.

Referring to FIGS. 1 through 7C, the air purifier 10 according to an exemplary embodiment may include a purifier main body 100, a first air blowing means 200, an air guidance part 300, and a second air blowing means 400.

The purifier main body 100, the first air blowing means 200 provided in the purifier main body 100 to introduce, purify, and discharge external air, the air guidance part 300 provided on a movement path of the air discharged from the first air blowing means 200 and pivotably coupled to an upper surface of the purifier main body 100 to determine an air discharge direction, and the second air blowing means 400 installed in the air guidance part 300 to blow air.

Figure 1:
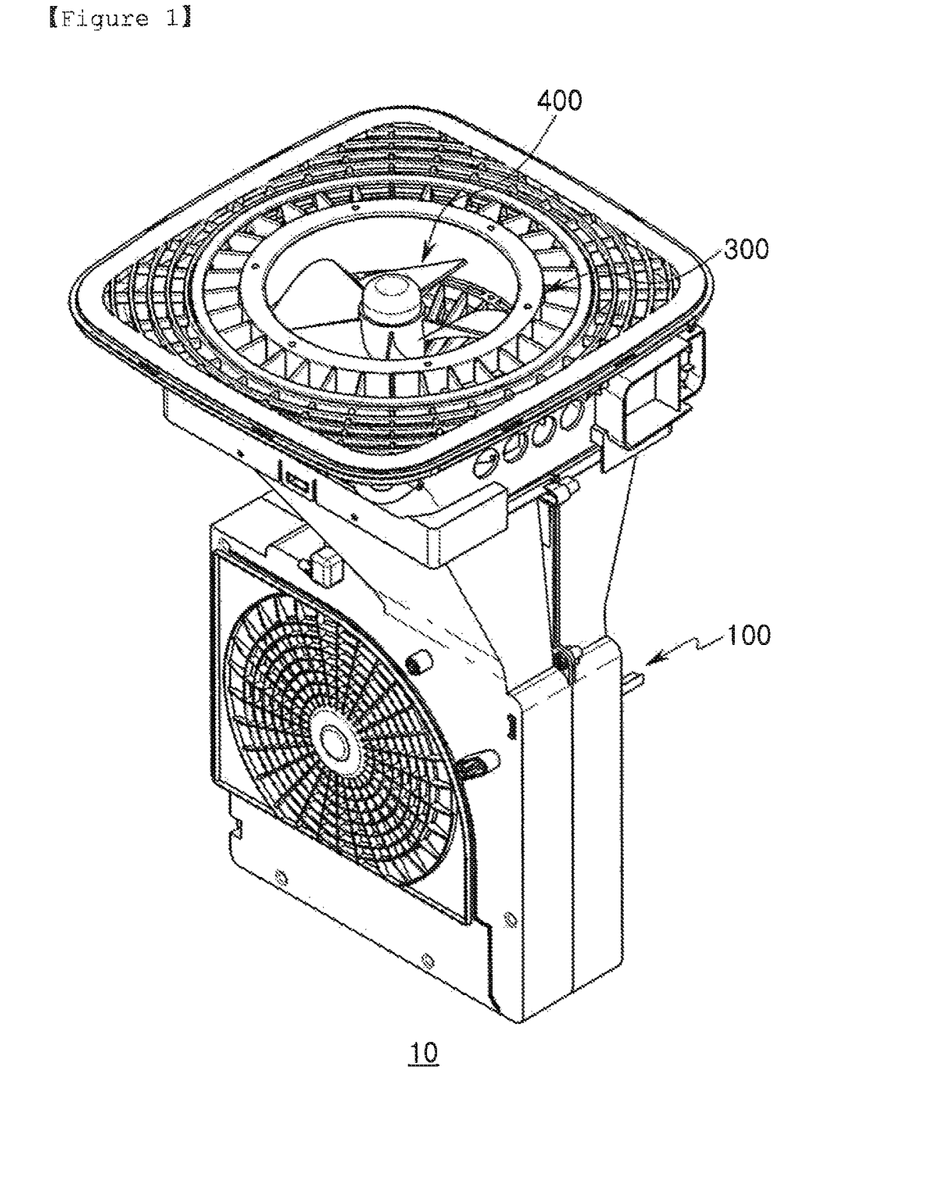
FIG. 1 is a perspective view of an air purifier according to an exemplary embodiment.
Figure 7A:
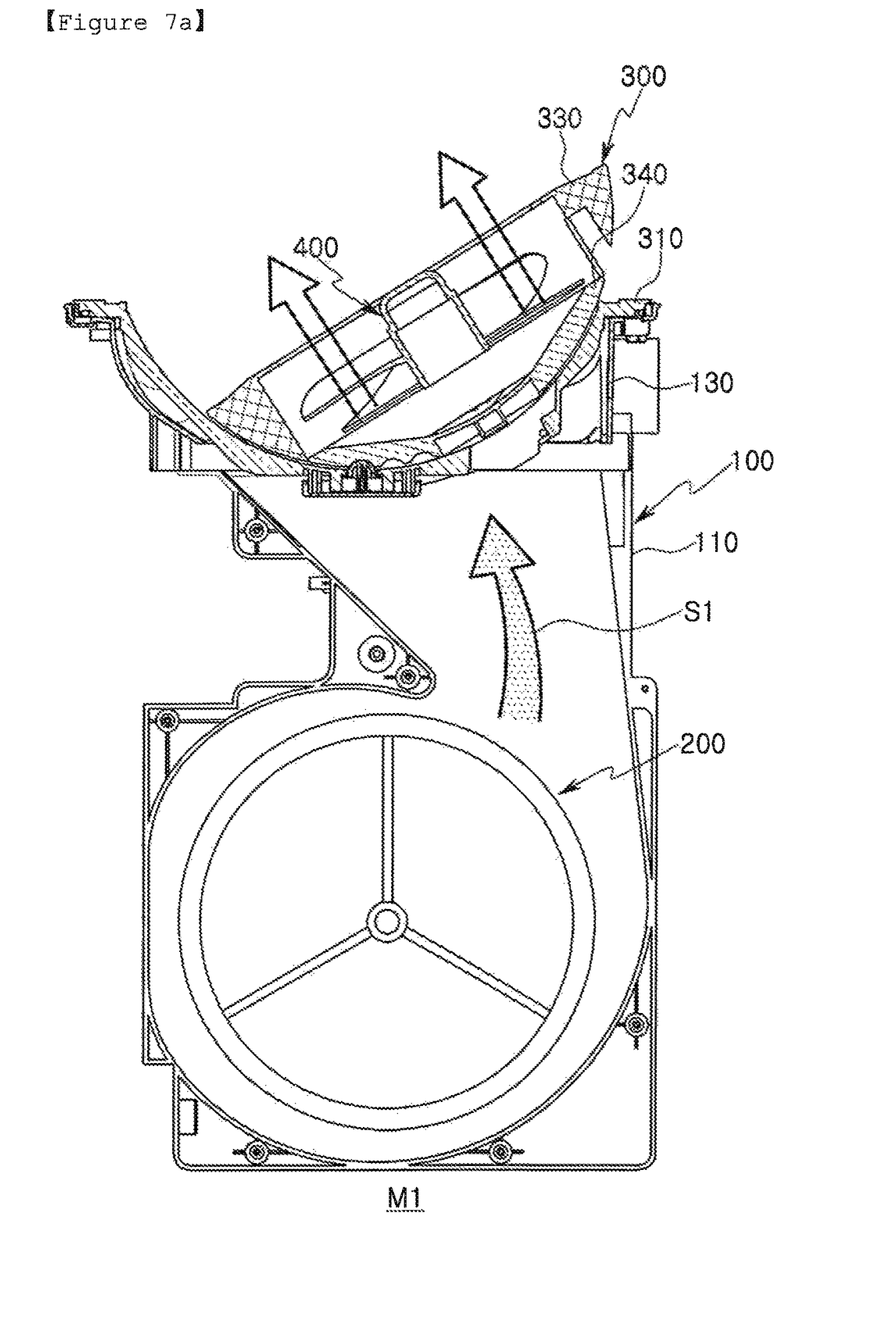
FIG. 7A is a drawing illustrating a state in which an air purifier according to an exemplary embodiment is in an air purifying mode.

As illustrated in FIGS. 1 and 7A, the purifier main body 100 may include a main housing 110 having an internal space, in which the first air blowing means 200 is installed.

The first air blowing means 200 introducing, purifying, and discharging external air may be provided in the main housing 110.

The first air blowing means 200 intakes air in a circumferential direction of the purifier main body 100 to discharge the air upwardly of an axial direction of the purifier main body 100.

The first air blowing means 200 is provided in the purifier main body 100. In addition, the first air blowing means intakes external air into an interior of the purifier main body 100, and then discharges the external air upwardly of an axial direction of the purifier main body 100, so an air flow may occur.

The first air blowing means 200 includes a filter to filter and purify air passing through a device.

The air guidance part 300 is a member provided on a movement path of air discharged from the first air blowing means 200 to determine an air discharge direction.

The air guidance part 300 is installed to be rotated in the purifier main body 100. Thus, compared as a case in which a discharge direction is fixed to upwardly, a blowing direction of air blowing from the air purifier 10 is formed to be wide, so overall circulation of air may be formed indoors, thereby improving purifying efficiency of indoor air.

The second air blowing means 400 is installed in the air guidance part 300 to provide discharge force for discharging air.

The second air blowing means 400 may include a blower fan having a drive motor, and an installation frame in which the blower fan is accommodated and which is installed in the air guidance part 300.

Although not illustrated, the installation frame may be provided as a cylindrical member in which flow paths of air are formed in an upper portion and a lower portion, and the installation frame may be fixed by a fastening member such as a bolt, or the like, to a fixing frame of an upper grill 330 and a lower grill 340 of the air guidance part 300.

The second air blowing means 400 is driven with the first air blowing means 200, and thus may be configured to provide additional discharge force to the air discharged by the first air blowing means 200.

Moreover, the second air blowing means 400 may be driven separately from the first blowing means 200, and only the second air blowing means 400 may be driven and used for indoor air circulation.

The air guidance part 300 may include a cover top 310, and a pivotably installed portion 320.

Figure 2:
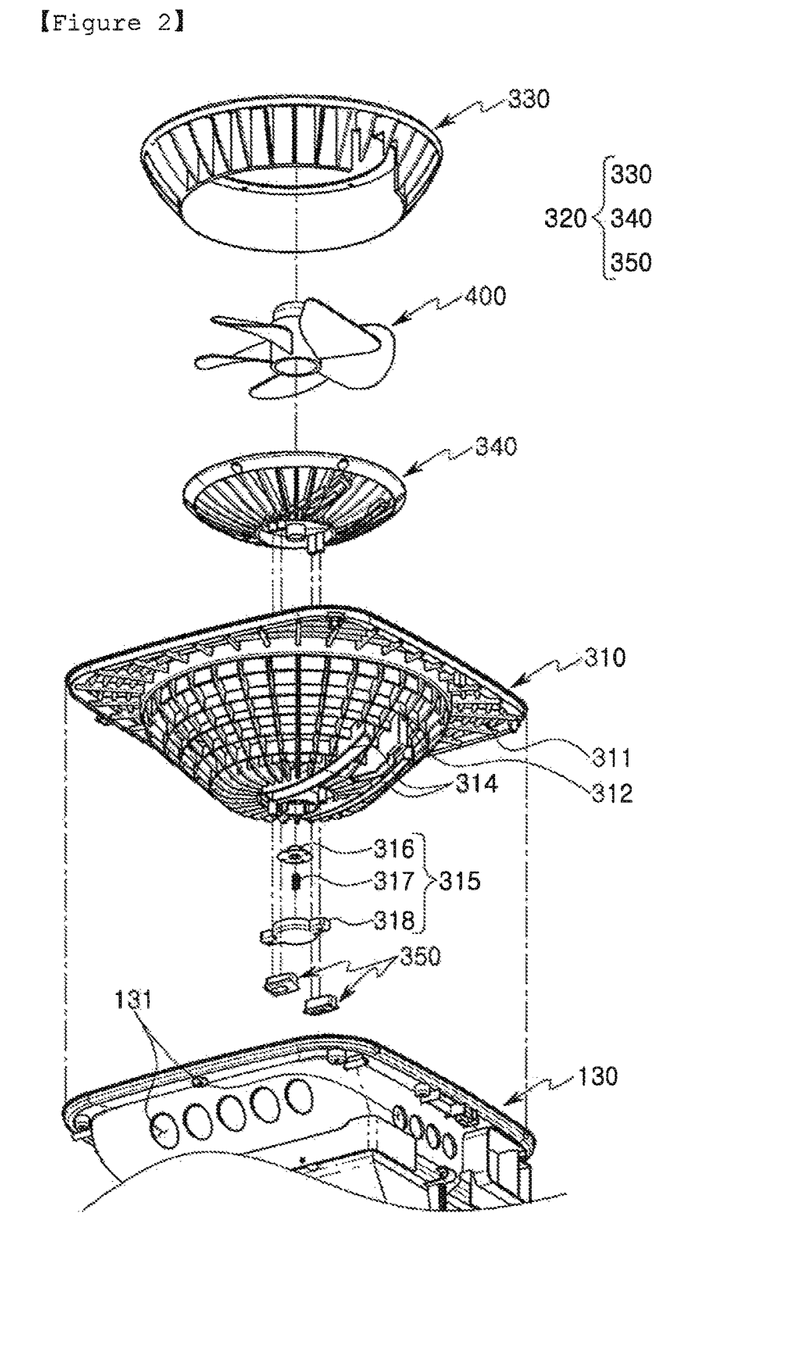
FIG. 2 is an exploded perspective view of a region including an air guidance part of an air purifier according to an exemplary embodiment.
Figure 4:
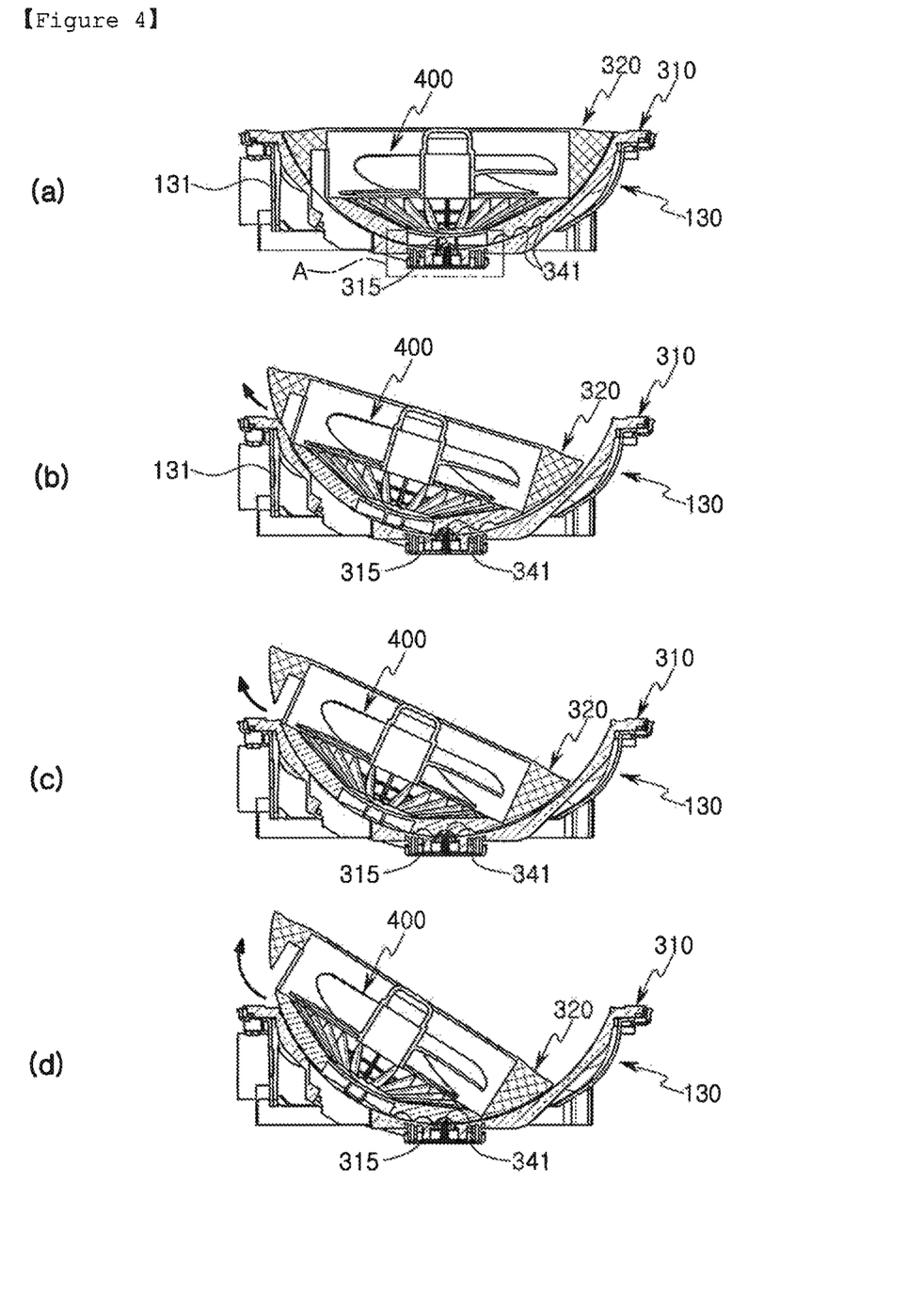
FIG. 4 is a drawing illustrating a manner in which an air guidance part of an air purifier according to an exemplary embodiment is rotated.

As illustrated in FIG. 2, as well as (a), (b), (c), and (d) of FIG. 4, the air guidance part 300 may have the cover top 310 provided in an upper surface of the purifier main body 100, and provided on a movement path of purified air discharged from the first air blowing means 200, and the pivotably installed portion 320 pivotably coupled to the cover top 310, and having the second air blowing means 400 installed therein.

As illustrated in FIG. 2, the cover top 310 may have a cover top main body 311 coupled to an upper surface of the purifier main body 100, and a guide installed portion 312 providing an installation portion of the air guidance part 300.

The guide installed portion 312 is a portion in which the pivotably installed portion 320 is installed, and may be provided to have a hemispherical shape. As the pivotably installed portion 320 having a hemispherical shape is rotated in the guide installed portion 312 of the cover top 310, the guide installed portion 312 is required to be configured in a shape corresponding to that of the pivotably installed portion 320.

The guide installed portion 312 is installed as grid-shaped members are crossed, so a flow path of air may be provided. Purified air discharged from the first air blowing means 200 and air introduced from the second air blowing means 400 may pass through the flow path.

The pivotably installed portion 320 may include the lower grill 340, the upper grill 330, and a rotation guide 350.

As illustrated in FIG. 2, the lower grill 340 provided in an upper portion of the cover top 310 and having the second air blowing means 400 mounted thereon, the upper grill 330 coupled to an upper portion of the lower grill 340 to form a space in which the second air blowing means 400 is accommodated, and the rotation guide 350 coupled to the lower grill 340 with the cover top 310 interposed therebetween, and guiding the pivotably installed portion 320 to be rotated in the cover top 310, may be included.

Figure 6:
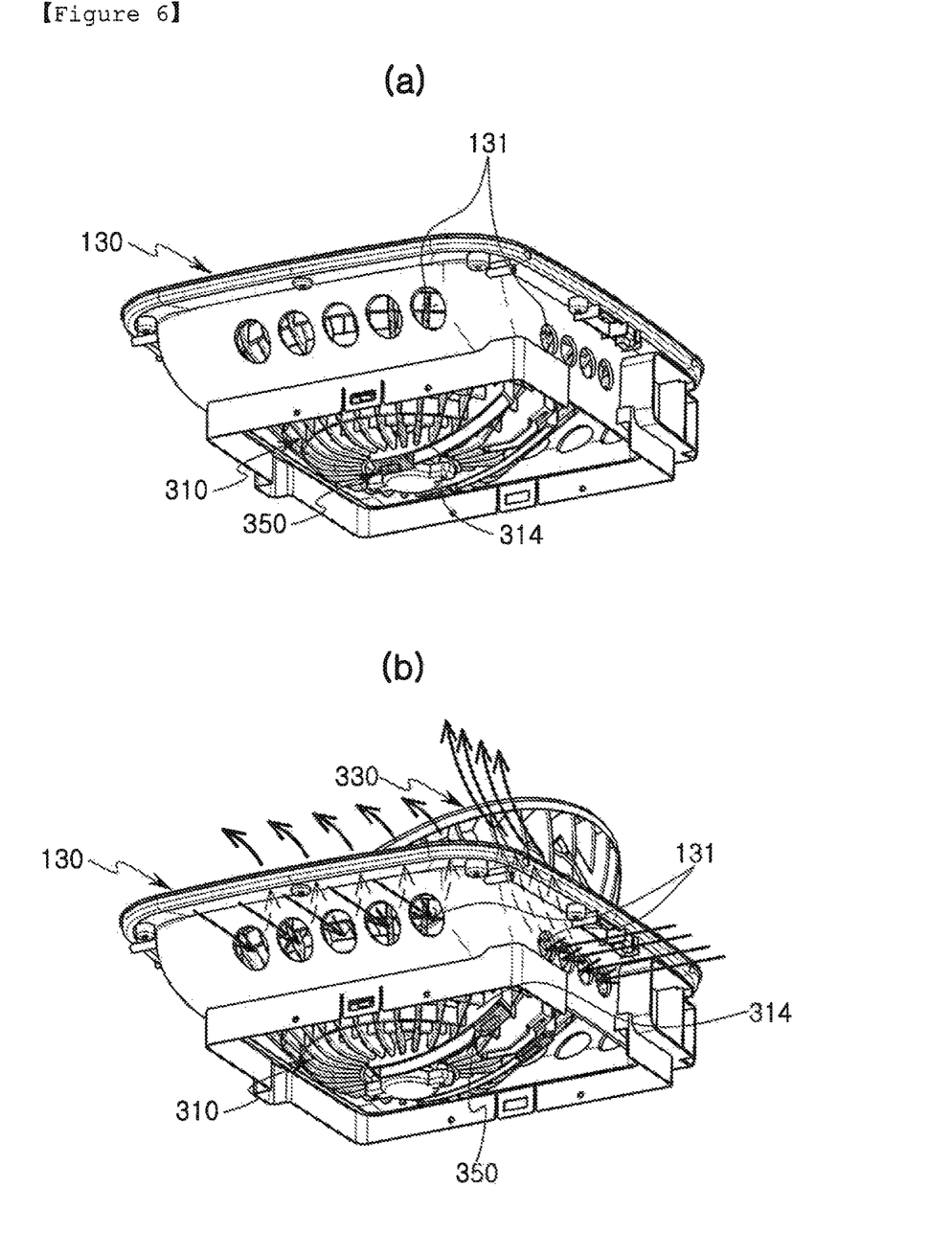
FIG. 6 is a drawing illustrating a state of rotation of an air guidance part of an air purifier according to an exemplary embodiment, and an inflow state of air through an air inlet of a guide top.

As illustrated in FIG. 2, as well as (a) and (b) of FIG. 6, the cover top 310 may have a guide rail 314 guiding rotation of the pivotably installed portion 320 in a bottom surface.

The rotation guide 350 is coupled to the lower grill 340 with the cover top 310 interposed therebetween, and may move on the guide rail 314.

A pair of guide rails 314 may be provided in a bottom surface of the cover top 310, and the guide rail 314 may be provided to have a curved shape corresponding to a shape of the bottom surface of the cover top 310.

As illustrated in FIG. 4, the lower grill 340 may be coupled to the cover top 310 to be rotated.

As a semi-curved protruding member 316 of a positioning rod 315 is selectively inserted into a plurality of positioning grooves 341 formed in a bottom surface of the lower grill 340, a rotation angle of the pivotably installed portion 320 having the lower grill 340, and the second air blowing means 400 installed in the pivotably installed portion 320 may be set.

Figure 5:
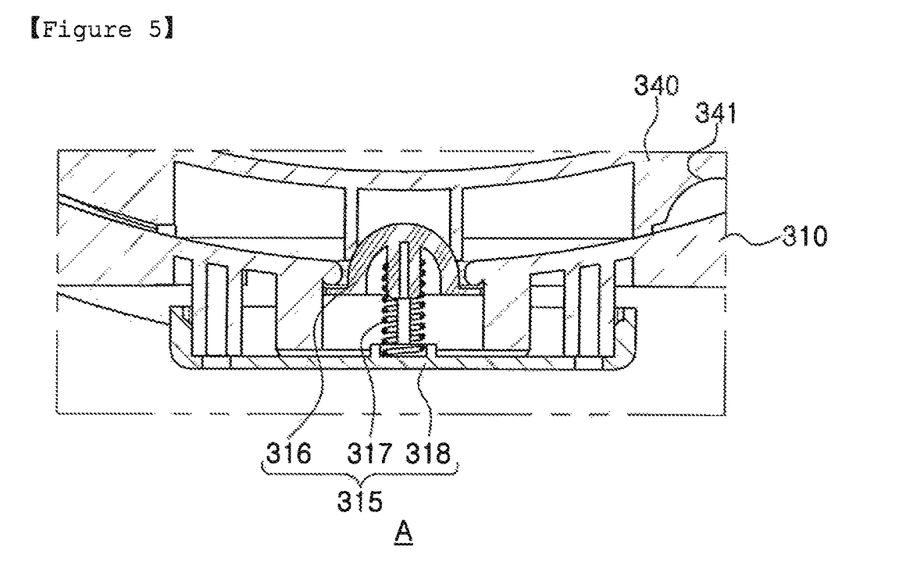
FIG. 5 is an enlarged detail view of region A of FIG. 4.

As illustrated in FIGS. 4 and 5, the lower grill 340 of the pivotably installed portion 320 has the plurality of positioning grooves 341 formed in a bottom surface to be spaced apart from each other, and the cover top 310 has the positioning rod 315 selectively inserted into a positioning groove 341 to set a rotation angle of the pivotably installed portion 320.

As illustrated in FIG. 4, the positioning groove 341 may be formed in a bottom surface of the lower grill 340 to be spaced apart from each other. In addition, as the positioning rod 315 is inserted into the positioning groove 341, a rotation angle of the pivotably installed portion 320 may be determined.

The positioning rod 315 may be installed to protrude from and be formed inwardly of an installation hole formed in the cover top 310.

As illustrated in FIG. 5, the positioning rod 315 may include the semi-curved protruding member 316 in which a separation prevention plate having a width larger than that of an installation hole of the cover top 310 is formed, and which protrudes from the installation hole to be inserted into the positioning groove 341, and an elastic member 317 elastically pressing a lower portion of the semi-curved protruding member 316.

While the elastic member 317 is inserted into a lower portion of the positioning rod 315, the cover top 310 and a cover member 318 may be coupled with the positioning rod 315 and the elastic member 317 interposed therebetween.

The semi-curved protruding member 316 of the positioning rod 315, and the elastic member 317 may be accommodated in a space formed by the cover top 310 and the cover member 318, and the semi-curved protruding member 316 of the positioning rod 315 may be configured to protrude to and be formed inwardly of an installation hole of the cover top 310.

The semi-curved protruding member 316 of the positioning rod 315 may protrude to an upper surface of the cover top 310 while being elastically pressed by the elastic member 317, and may be fixed to the positioning groove 341.

The semi-curved protruding member 316 of the positioning rod 315 is pressed by the elastic member 317, so the semi-curved protruding member is prevented from being easily separated from the positioning groove 341 into which the semi-curved protruding member is inserted.

The purifier main body 100 may have the main housing 110, and a guide top 130.

Figure 3:
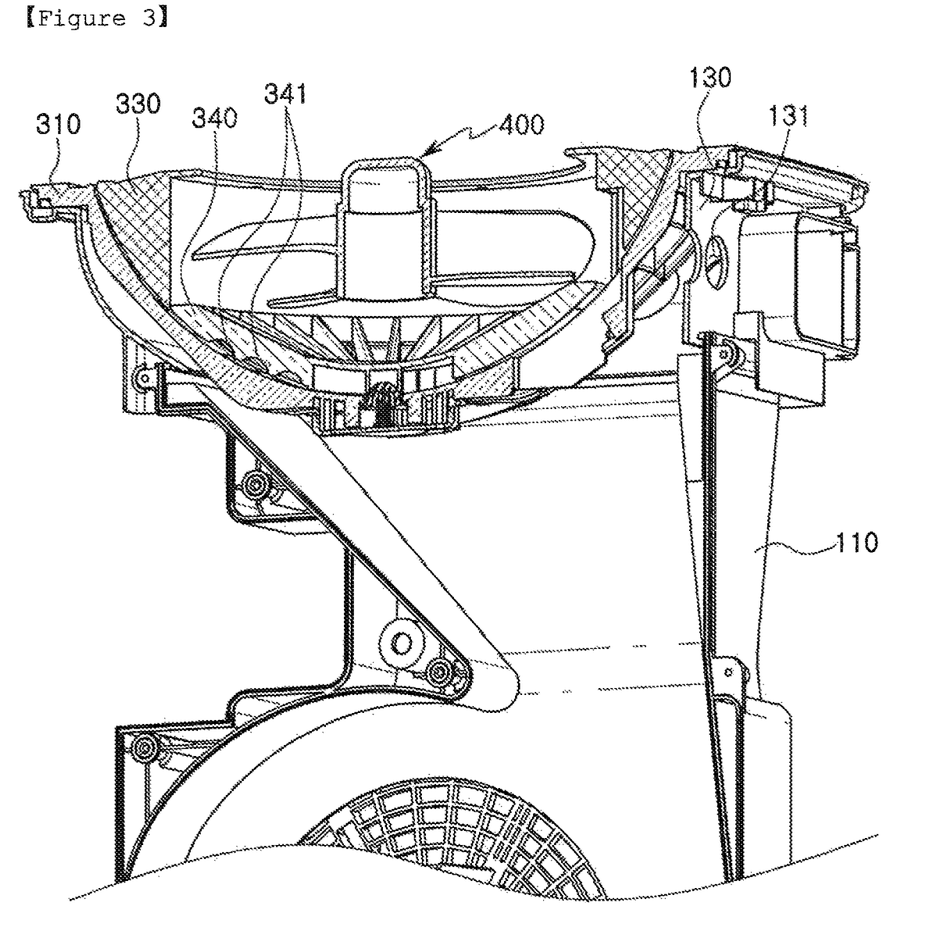
FIG. 3 is a cross-sectional view of a coupled state of a region including an air guidance part of an air purifier according to an exemplary embodiment.

As illustrated in FIG. 3, the purifier main body 100 may have the main housing 110 having an internal space, in which the first air blowing means 200 is installed, and the guide top 130 provided in an upper surface of the main housing 110 and having the air guidance part 300 mounted thereon.

As illustrated in FIG. 6, at least one air inlet 131, through which external air flows, may be formed in the guide top 130.

Outdoor air may be introduced through the air inlet 131 formed in the guide top 130 by discharge force introduced by the second air blowing means 400.

Although not illustrated, the cover top 310 is installed in the guide top 130 to be rotated so as to allow the air guidance part 300 and the second air blowing means 400 installed in the air guidance part 300 to be rotated above the purifier main body 100.

The cover top 310 is installed in the guide top 130 to be rotated, so as to allow the air guidance part 300 and the second air blowing means 400 installed in the air guidance part 300 to be rotated above the purifier main body 100. A first rail portion is provided in an upper surface of the guide top 130, and a second rail portion installed in the first rail portion to be rotated is provided in the cover top 310.

In this case, in order to easily rotate the cover top 310 in the guide top 130, the first rail portion and the second rail portion are provided as members having the form of a ring to correspond to each other.

The first air blowing means 200 and the second air blowing means 400 may be provided to be driven independently of each other.

Figure 7B:
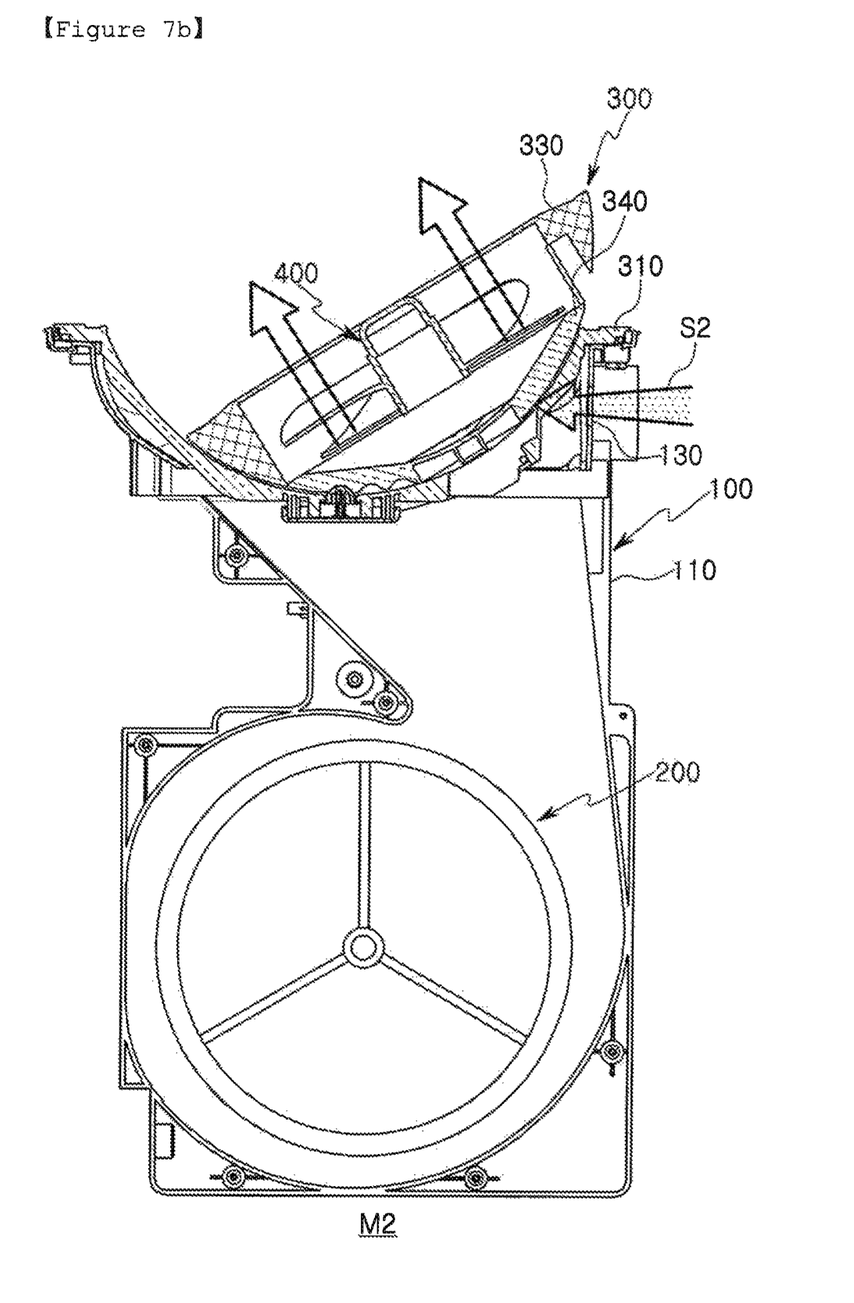
FIG. 7B is a drawing illustrating a state in which an air purifier according to an exemplary embodiment is in a blowing mode.
Figure 7C:
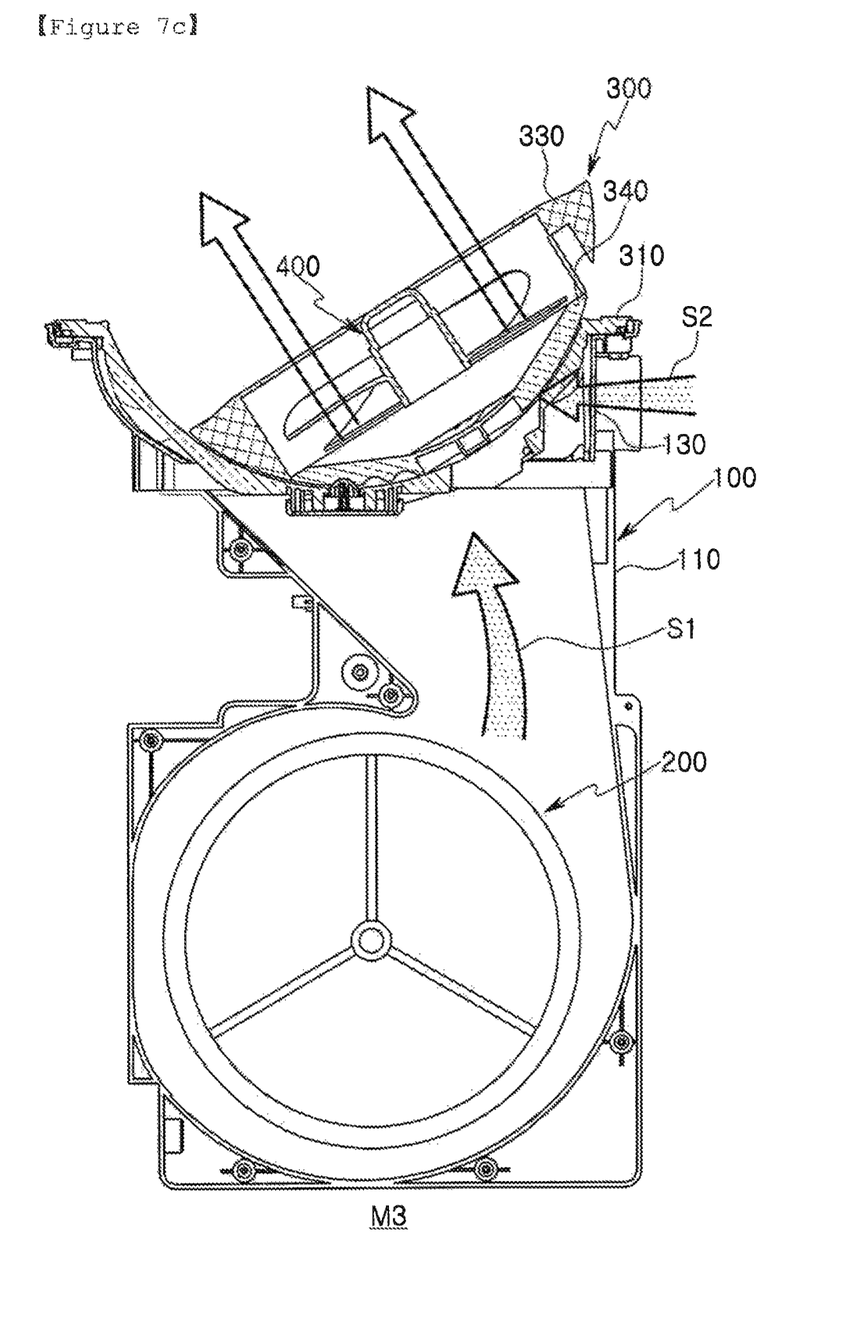
FIG. 7C is a drawing illustrating a state in which an air purifier according to an exemplary embodiment is in a purifying and blowing mode.

As illustrated in FIGS. 7A through 7C, the air purifier 10 may have an air purifying mode M1, a blowing mode M2, and a purifying and blowing mode M3.

As illustrated in FIG. 7A, in the air purifying mode M1, only the first air blowing means 200 is driven, so air moves through a first inflow path S1.

As illustrated in FIG. 7B, in the blowing mode M2, only the second air blowing means 400 is driven, so air moves through a second inflow path S2.

As illustrated in FIG. 7C, in the purifying and blowing mode M3, the first air blowing means 200 and the second air blowing means 400 are driven together, so air moves through the first inflow path S1 and the second inflow path S2.

The air purifier 10 may have the air purifying mode M1 of discharging air purified in the purifier main body 100 as the first air blowing means 200 is driven and the second air blowing means 400 is stopped, the blowing mode M2 of blowing air introduced as the first air blowing means 200 is stopped and the second air blowing means 400 is driven, and the purifying and blowing mode M3 of blowing air by applying additional discharge force to purified air, discharged by the first air blowing means 200, with the second air blowing means 400 toward an interior space as the first air blowing means 200 and the second air blowing means 400 are driven together.

As illustrated in FIG. 7A, when the air purifying mode M1 is executed, the first air blowing means 200 is driven, and the second air blowing means 400 is stopped. In other words, air purified in the purifier main body 100 may be discharged indoors by the first air blowing means 200.

In the case of the air purifying mode M1, a foreign object, such as a dust particle floating in an interior space, or the like, is removed, so purified air is discharged indoors. Thus, an effect of improving a quality of indoor air may occur.

In addition, in the case of the air purifying mode M1, although purified air is not strongly discharged, an advantage in which noise generated by the air purifier 10 is reduced may occur.

As illustrated in FIG. 7B, when the blowing mode M2 is executed, the first air blowing means 200 is stopped, and the second air blowing means 400 is driven.

In the case of the blowing mode M2, air introduced into the air purifier 10 is strongly discharged. Thus, an effect in which air circulation throughout a room is formed may occur.

As illustrated in FIG. 7C, when the purifying and blowing mode M3 is executed, the first air blowing means 200, and the second air blowing means 400 may be driven together.

In the case of the purifying and blowing mode M3, purified air is discharged indoors, so a quality of indoor air may be improved. In addition, air introduced to the air purifier 10 is strongly discharged. Thus, an advantage in which air circulation, throughout a room, is formed may occur.

However, as the first air blowing means 200 and the second air blowing means 400 are driven at the same time, compared to the air purifying mode M1, noise generated by the air purifier 10 may increase.

While the present disclosure has been particularly shown and described with reference to exemplary embodiments thereof, but is not limited thereto. It is apparent to those skilled in the art that various changes and modifications thereof may be made within the spirit and scope of the present disclosure, and therefore to be understood that such changes and modifications belong to the scope of the appended claims.

The invention claimed is:

1. An air purifier, comprising:
a purifier main body;
a first air blower provided in the purifier main body to introduce, purify, and discharge external air;
an air guidance part provided on a movement path of the air discharged from the first air blower and pivotably coupled to an upper surface of the purifier main body to determine an air discharge direction; and
a second air blower installed on the air guidance part to blow air,
wherein the air guidance part includes: a cover top provided on the upper surface of the purifier main body and provided on a movement path of purified air discharged from the first air blower; and a pivotably installed portion pivotably coupled to the cover top, and having the second air blower installed therein.

2. The air purifier of claim 1, wherein the pivotably installed portion includes:
a lower grill provided in an upper portion of the cover top and having the second air blower mounted thereon;
an upper grill coupled to an upper portion of the lower grill and forming a space in which the second air blower is accommodated; and
a rotation guide coupled to the lower grill with the cover top interposed therebetween to guide the pivotably installed portion to pivot on the cover top.

3. The air purifier of claim 2, wherein the cover top has a guide rail guiding rotation of the pivotably installed portion on a bottom surface, and
the rotation guide is installed to move on the guide rail.

4. The air purifier of claim 2, wherein the lower grill has a plurality of positioning grooves formed in a bottom surface to be spaced apart from each other, and
the cover top has a positioning rod selectively inserted into the positioning groove to set a rotation angle of the pivotably installed portion.

5. The air purifier of claim 1, wherein the purifier main body includes:
a main housing having an internal space, in which the first air blower is installed; and
a guide top provided in an upper surface of the main housing and having the air guidance part mounted thereon.

6. The air purifier of claim 5, wherein the guide top has at least one air inlet, through which external air flows.

7. The air purifier of claim 5, wherein the cover top is installed on the guide top to be rotated, so as to allow the air guidance part and the second air blower installed in the air guidance part to be rotated above the purifier main body,
an upper surface of the guide top is provided with a first rail portion, and
a lower surface of the cover top is provided with a second rail portion installed in the first rail portion to be rotated.

8. The air purifier of claim 1, wherein the first air blower and the second air blower are provided to be independently driven.

9. The air purifier of claim 1, having:
an air purifying mode discharging air purified in the purifier main body, as the first air blower is driven and the second air blower is stopped;
a blowing mode blowing air, having been introduced, as the first air blower is stopped and the second air blower is driven; and
a purifying and blowing mode applying additional discharge force to purified air, discharged by the first air blower, with the second air blower to blow the air to an interior space, as the first air blower and the second air blower are driven.

* * * * *

UNITED STATES PATENT AND TRADEMARK OFFICE
CERTIFICATE OF CORRECTION

| | | |
|---|---|---|
| PATENT NO. | : 10,688,431 B2 | Page 1 of 1 |
| APPLICATION NO. | : 15/560661 | |
| DATED | : June 23, 2020 | |
| INVENTOR(S) | : Sang-Woo Kang et al. | |

It is certified that error appears in the above-identified patent and that said Letters Patent is hereby corrected as shown below:

On the Title Page

Item (22) PCT Filed:
"March 25, 2016" should be "April 9, 2015"

Signed and Sealed this
Ninth Day of February, 2021

Drew Hirshfeld
*Performing the Functions and Duties of the
Under Secretary of Commerce for Intellectual Property and
Director of the United States Patent and Trademark Office*